United States Patent [19]
Fuller et al.

[11] Patent Number: 5,282,244
[45] Date of Patent: Jan. 25, 1994

[54] VIRTUAL SIGNALING NETWORK METHOD

[75] Inventors: Stephen Fuller, Flanders; LaVerne A. Hargraves, Aberdeen; Luis E. Nieto, East Brunswick, all of N.J.

[73] Assignee: AT&T Bell Laboratories, Murray Hill, N.J.

[21] Appl. No.: 719,851

[22] Filed: Jun. 24, 1991

[51] Int. Cl.$^5$ .................. H04M 3/42; H04M 7/06; H04M 15/00
[52] U.S. Cl. .................. 379/230; 379/112; 379/196; 379/207; 379/221
[58] Field of Search .............. 379/207, 221, 112, 230, 379/196, 197, 220

[56] References Cited

U.S. PATENT DOCUMENTS

| | | | |
|---|---|---|---|
| 4,348,554 | 9/1982 | Asmuth | 379/113 |
| 4,811,334 | 3/1989 | Matt | 379/207 X |
| 4,982,421 | 1/1991 | Kirsch et al. | 379/216 |
| 5,103,475 | 4/1992 | Shuen | 379/115 |

OTHER PUBLICATIONS

"Service Control Point: The Brains Behind the Intelligent Networks", J. O. Boese et al., *Bellcore Exchange*, Nov./Dec. 1987, pp. 13–17.

"Meeting Private Needs with the Public Network", L. Pierce et al., *Bellcore Exchange*, Jan./Feb. 1988, pp. 8–13.

"Evolution in Business Networking", M. Davis et al, *Telesis* 1988 Three (Canada), pp. 23–31.

"The Building Block for the Intelligent Network" V. K. Batra, *Telephony* vol. 217, No. 22, pp. 56–64, Nov. 20, 1989.

"SS7 Interconnection Awaits Green Light" T. Lanning, *Telephony Supplement* Nov. 1990, pp. 32–34.

"Common Channel Signaling-Key to Control of Modern Telecommunications Networks" R. L. Simms, *Globecom '86*, IEEE Global Telecommunications Conference Record, pp. 623–626, vol. 1, 1986.

"SS7 Gateways Serve and Protect" C. Buckles, *Telephony*, vol. 217, No. 22, pp. 39–41, 44, Nov. 20, 1989.

"Common Channel Signaling for Independents" R. Hilton and C. Buckles, *Telephone Engineer and Management*, vol. 92, No. 12, pp. 71–74, Jun. 15, 1988.

"Common Channel Signalling-Possible Future Application" C. J. Dougall *Telecommunication Journal of Australia*, vol. 36, No. 3, 1986, pp. 43–45.

*Primary Examiner*—Thomas W. Brown
*Attorney, Agent, or Firm*—Barry H. Freedman

[57] ABSTRACT

A Common Channel Signaling Network such as the SS7 network is configured as a virtual signaling network, such that the network is shared in common among several users. Each user, which may be a private network operator, an ICO, a RBOC, a cellular mobile carrier, or an interexchange carrier, appears to control the signaling network and is enabled to use a wide variety of its capabilities to transmit and receive both trunk signaling messages and database messages to and from other networks connected to the virtual signaling network. The invention is implemented by interconnecting signal transfer points (STPs) within the virtual signaling network that operate in accordance with our invention with the SS7 switches and/or signal transfer points of other networks. Signaling messages presented to the STPs in the virtual signaling network are screened to insure security, translated in accordance with stored translation tables so as to allow message transport between the user's network and the appropriate destination network, and then addressed and routed to the proper destinations.

10 Claims, 9 Drawing Sheets

VIRTUAL SIGNALING NETWORK METHOD

FIELD OF THE INVENTION

The present invention relates generally to signaling in or between telecommunications networks, and, in particular to a virtual signaling system that can be shared by several interconnected telecommunications networks.

BACKGROUND OF THE INVENTION

The virtual explosion of sophisticated services that can be offered to present subscribers of telecommunications services is due in large part to the network architecture developed by AT&T in which a separate and dedicated Common Channel Signaling System 7 (SS7) network is used to transport out of band trunk signaling and database messages separate from customer voice or data messages transported over the telecommunications network.

Signaling System 7 (SS7) has been widely characterized as a new functional protocol element for a telecommunications network that is the key to ubiquitous deployment of advanced services. V. K. Batra, in an article entitled "The Building Block for the Intelligent Network", Telephony, Vol. 217, No. 22, p. 56 et. seq., Nov. 20, 1989, states that the SS7 network, which is based on the North American version of the CCITT Signaling System 7 protocol, will be the standard protocol for reliable, bidirectional communications between intelligent network nodes using packet switching techniques. An article by T. Lanning entitled "SS7 Interconnection Awaits Green Light", Telephony Suppl. p. 32, 34, November 1990, states that common channel signaling interconnection according to the SS7 protocol will increase network efficiency, reduce basic call setup time and make possible the creation of new services on a nationwide basis. Ultimately, it will pave the way for the evolution of the Advanced Intelligent Network and establish a framework for further advances in the integrated services digital network (ISDN). An instructive survey article containing many supporting references is entitled "Common Channel Signaling-Key to Control of Modern Telecommunications Networks" by R. L. Simms, GLOBECOM '86, IEEE Global Telecommunications Conference Record, p. 623-6 Vol. 1, 1986.

Because it has been recognized that SS7 network architectures concentrate valuable and proprietary information in centralized network databases, it has been found desirable to arrange gateways to screen SS7 messages to ensure network security. This is described, for example, in an article entitled "SS7 Gateways Serve and Protect" by C. Buckles, which appeared in Telephony, Vol. 217, No. 22, p. 39-41, 44, dated Nov. 20, 1989. According to the author, the gateway, which is implemented in the signal transfer point, also supports internetwork routing and exchange of network management messages that communicate the status of interconnected SS7 networks. Further, the gateway collects and reports measurement data on the gateway screening activity.

The importance of SS7 networks to telecommunications has led certain independent telephone companies (ICOs) to choose to implement their own compatible signaling systems so that they can easily communicate with both interexchange carriers such as AT&T as well as Regional Bell Operating Companies (RBOCs). This is described in an article entitled "Common Channel Signaling for Independents" by Hilton and Buckles, which appeared in Telephone Engineer and Management, Vol. 92, No. 12, p. 71-4, dated Jun. 15, 1988.

However, many ICOs, and other entities that own or provide private networks, cannot at present avail themselves of the features and full advantages of the SS7, due in part to budgetary reasons. This is because establishing and maintaining a broad-based signaling network is extremely expensive. Therefore, these network entities may have very limited SS7 capabilities.

SUMMARY OF THE INVENTION

In accordance with the present invention, a Common Channel Signaling Network such as the SS7 network is configured as a virtual signaling network ("VSN"), such that the network is shared in common among several users. Each user, which may be a private network operator, an ICO, a RBOC, a cellular mobile carrier, or an interexchange carrier, appears to control the signaling network and is enabled to use a wide variety of its capabilities to transmit and receive both trunk signaling messages and database messages to and from other networks connected to the virtual signaling network. The invention is implemented by interconnecting signal transfer points (STPs) within the virtual signaling network that operate in accordance with out invention with the SS7 switches and/or signal transfer points of other networks. Signaling messages presented to the STPs in the virtual signaling network are screened to insure security, i.e., the security of the VSN as well as the security of the interconnected network. Database messages received in STPs in the virtual signaling network are then translated in accordance with stored translation tables so as to allow message transport between the user's network and the appropriate destination network. All messages are then addressed and routed to the proper destinations. In accordance with another aspect of the invention, the signaling messages applied to the virtual signaling network by each user are "measured" or tallied, so that bills based on the actual usage of the virtual signaling network can be rendered.

The invention is advantageous and beneficial to ICOs, RBOCs, cellular mobile carriers, and others that operate private networks because it provides them with a cost-effective means of implementing SS7 on a nationwide basis. The invention also allows users to provide new revenue generating services (such as ISDN) which require SS7 capabilities. Users will also be able to access various local and remote databases to retrieve service information.

BRIEF DESCRIPTION OF THE DRAWINGS

The present invention will be better appreciated by consideration of the following Detailed Description which should be read in light of the accompanying drawings.

DETAILED DESCRIPTION

Figure 1:
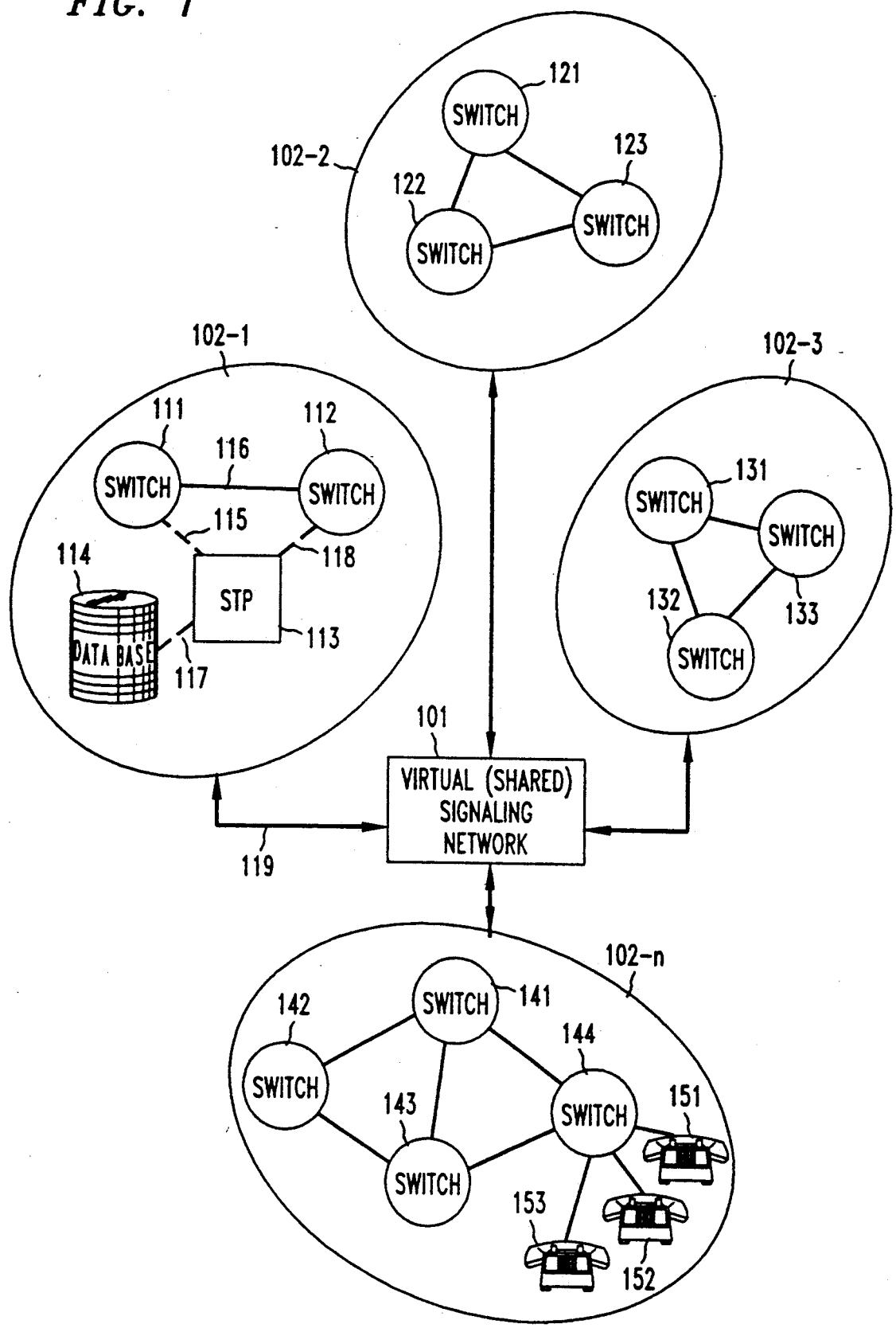
FIG. 1 is a block diagram indicating the interconnections between a virtual signaling network of the present invention and telecommunications networks belonging to (1) ICOs or other private entities; (2) RBOCs; (3) interexchange carriers such as AT&T and Other Common Carriers (OCCs); and (4) cellular mobile carriers.

Referring first to FIG. 1, a block diagram is shown indicating the interconnections between a virtual (shared) signaling network 101 of the present invention and several other illustrative telecommunications networks 102. For example, network 102-1 contains a pair of telecommunications switches (such as the AT&T 4ESS TM electronic switching system) 111 and 112 and a signaling transfer point (STP) 113 that is interconnected with both switches 111 and 112 via signaling links 115 and 118. STP 113, which may be an AT&T #2ASTP, is arranged to carry signaling traffic within Network 102-1 only. In a typical configuration, STP 113 may be interconnected with an associated database 114, which contains stored information to support various applications such as calling card validation and 800 service. Some networks may include several STPs, while others may only include SS7 compliant switches, i.e. switches that are arranged to generate signaling information in the SS7 format. Examples of SS7 switches are the AT&T 5ESS TM and 1AESS TM switches. Therefore, the interconnection 119 between virtual signaling network 101 and network 102-1 may be made directly from STP 113 or from switches 111 or 112. In FIG. 1, networks 102-2 and 102-3 are each shown as including three interconnected switches 121-123 and 131-133, respectively; these networks do not include a separate STP. Network 102-n includes four switches 141-144, and no STP. Obviously, each network may have more or fewer switches or STPs, if desired. In network 102-n, some of the terminal equipment, such as voice or data terminals 151-153 are shown connected to switch 144.

The significance of FIG. 1 is the fact that virtual signaling network (VSN) 101 of the present invention interconnects a plurality of individual networks 102-1 to 102-n, some of which may include their own internal signaling equipment (STPs, switches, and databases) and some of which may only include SS7 capable switches. VSN 101, as will be seen hereinafter, enables the completion of telecommunications transactions (call routing and call completion, database queries, etc.) between switching systems within a particular network or between switching systems located in different networks.

Figure 2:
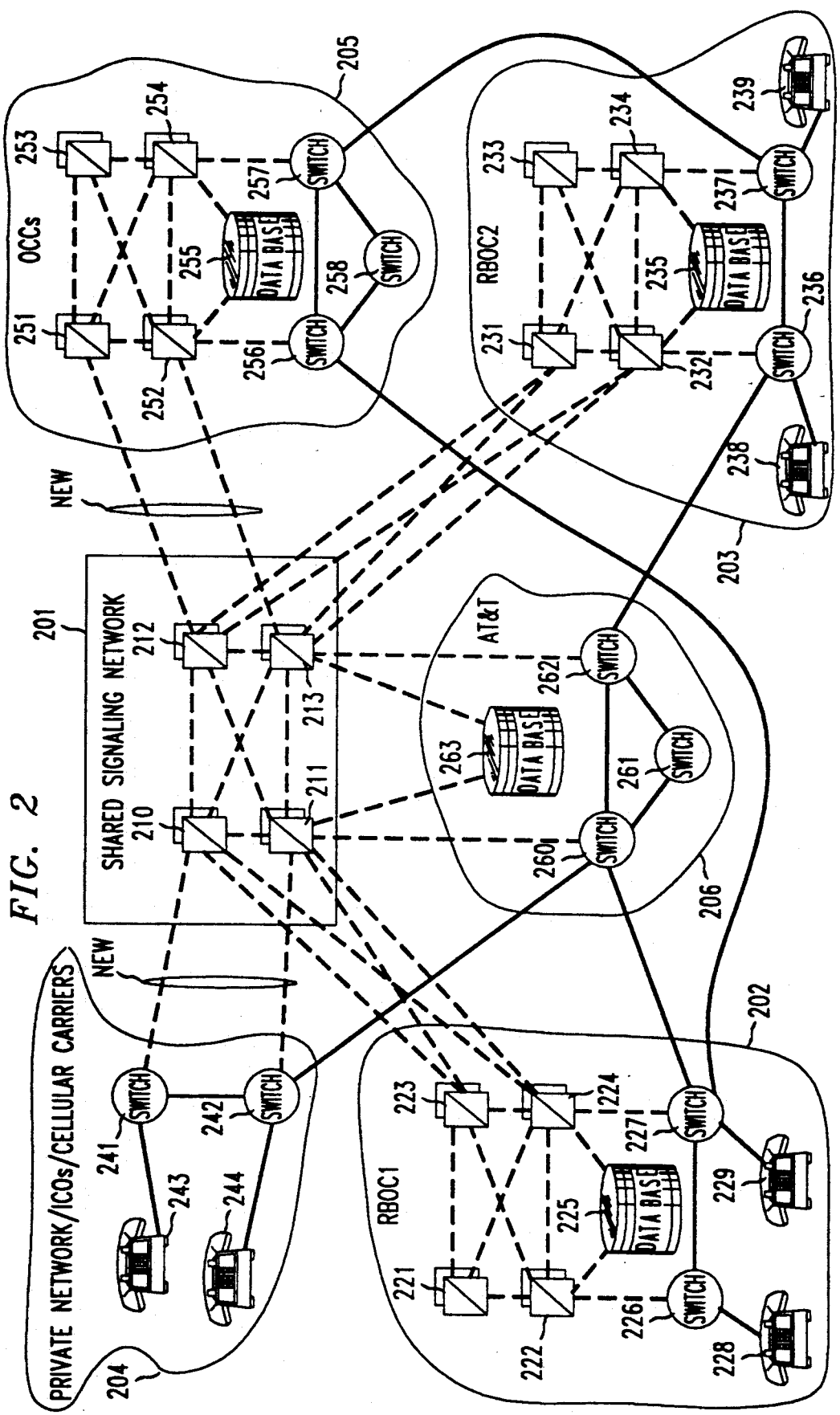
FIG. 2 is a more detailed block diagram illustrating the interconnections of the various signaling points of FIG. 1 and depicting the signaling and message paths between the various individual networks.

FIG. 2 illustrates the purpose and arrangement of a virtual signaling network in accordance with the present invention, from a somewhat different perspective. As shown, an STP network 210-213 which is completely interconnected by signaling links, constitutes the backbone for a shared signaling network 201 in accordance with the present invention. This network, if properly configured and controlled, as will be explained further below, will constitute a "virtual" signaling network. Network 201 can transmit signaling messages to, and receive signaling messages from, a plurality of communications networks, specifically networks 202-206.

Networks 202 and 203 represent diagrammatically, in grossly oversimplified form, communications networks operated and maintained by Regional Bell Operating Companies (RBOCs). These networks typically include several interconnected switches, such as switches 226 and 227 in network 202 and switches 236 and 237 in network 203; and several interconnected STPs, such as STPs 221-224 in network 202 and STPs 231-234 in network 203. A database 225 may be interconnected with STPs 222 and 224 and may contain useful service-related information. A corresponding database 235 may be provided within network 203. Terminal equipment included in, and supported by network 202, includes stations 228 and 229; similar terminal equipment (stations 239 and 238) is found in network 203.

Network 204 represents diagrammatically, also in grossly oversimplified form, a "simple" private network that may be operated by a business entity or an independent telephone company (ICO). Network 204 includes two interconnected switches 241 and 242. Terminal equipment supported by network 204 includes stations 243 and 244.

Network 205 represents diagrammatically, also in grossly oversimplified form, a telecommunications network that is operated and maintained by an interexchange carrier (IXC) other than the carrier providing the virtual signaling network in accordance with our invention. Topographically, this network closely resembles networks 202 and 203 since it includes interconnected switches 256-258; a network of STPs 251-254 is arranged to handle signaling messages for the switches, and a database 255 is interconnected with some of the STPs. Because network 205 is an interexchange network, terminal equipment is not typically connected directly to switches 256-258.

Finally, network 206 in FIG. 2 represents, in oversimplified form, a network of interconnected switches 260-262 which may be operated and maintained by the virtual signaling network provider, such as AT&T. Routing of messages through network 206 is accomplished under the control of signaling messages that are processed in network 201. Network 206 also includes a database 263 that supports services provided by network 201.

The operation of network 201 as a shared" or "virtual" signaling network will be better understood by differentiating the functionality currently available using network 201 from the functionality available when network 201 is arranged in accordance with our invention.

At present, network 201 provides signaling for messages originating in local exchange carriers' networks, such as networks 202, 203 or 204, and destined for switching systems in telecommunications network 206, which, as stated previously, may be operated and maintained by an interexchange carrier (IXC) such as AT&T. Thus, for example, a call originating in station 228 in network 202 and destined for a location outside of the LATA served by the RBOC that operates network 202 is coupled to switch 226. Signaling information, derived from the call is routed to STP 222 over a signaling path (dashed line in FIG. 2). Signaling for the call may be transmitted through other STPs in network 202, so that the call can be properly routed. In the example given, the signaling message may be extended from STP 222 to STP 223, and the actual call path may extend from switch 226 to switch 227, in preparation for transmission outside of network 202.

Since the call in the example under consideration is an inter-LATA call and is thus destined for a termination point outside of network 202, the signaling message may then be transmitted to an STP such as STP 210 in network 201. This enables the call to be routed from switch 227 to a switch within network 206, such as switch 260. From this point, the signaling message may be transported to other STPs in network 201 or to database 263. The call itself may be routed to another switch 261 or 262 in network 206, or may be connected directly to a terminating destination, for example station 238 or 239 located in network 203.

Because networks 204 and 205 are not currently connected to network 201, messages originating in these networks cannot currently take advantage of the common channel signaling features available through use of network 201 and database 263. However, these networks are nevertheless interconnected so as to receive messages from the other networks in FIG. 2. Also, calls originating in network 202 and destined for network 203 via "Other Common Carrier" (OCC) network 205 (e.g., from station 229 through switches 227,256,257, 237 to station 239) do not currently use signaling network 201.

Thus, it will be observed that network 201 is today used exclusively for inter LATA calls that are set up through switches in network 206.

In accordance with the present invention, network 201 is also enabled to provide signaling transport for messages (a) originating in private telecommunications networks or ICO networks, such as network 204, or (b) originating in networks 202 or 203 that are routed through a communications network 205 operated by an OCC other than AT&T. Network 201 can also transport database queries destined for various databases.

Some of the specific features that can be achieved when network 201 is arranged in accordance with our invention are as follows:

1. Transport of messages, such as calling card queries and responses, from/to Line Information Databases (LIDBs) such as database 225 or 235 that are owned by an RBOC or an ICO. These queries/responses may, for example, be used for telephone calling card validation purposes.

2. Validations of IXC's calling cards using database 255, when such cards are used to make intra-ICO or intra-LATA calls originating and terminating, for example, in network 204.

3. Permitting access by ICO network 204 to an "equal access" 800 number database (such as database 225 or 235) so that an ICO can identify the appropriate IXC for any 800 number dialed by an ICO customer.

4. Providing ICO network 204 with the ability to transport SS7 ISDN-User Part (ISUP) messages that in turn allow the ICO to set up, hold and terminate calls between (a) two switching systems within network 204, and between (b) a switching system in network 204 and an IXC switching system in network 205 or 206.

It is important to note, with respect to FIG. 2, that several interconnections, not heretofore available, are made between the networks shown in that figure. Specifically, switches 241 and 242 in ICO network 204 are interconnected with STPs 210 and 212, respectively, in network 201. Also, STPs 251 and 253 in OCC network 205 are interconnected with STPs 212 and 213, respectively, in network 201. One desirable characteristic of this invention is thus seen to be the provision of at least two independent signaling paths between a network such as networks 204 and 205 and individual STPs within network 201. The pair of paths originate, in the case of network 204, from separate switches (241 and 242), while in the case of network 205, the paths originate from separate STPs 251 and 252.

Figure 3:
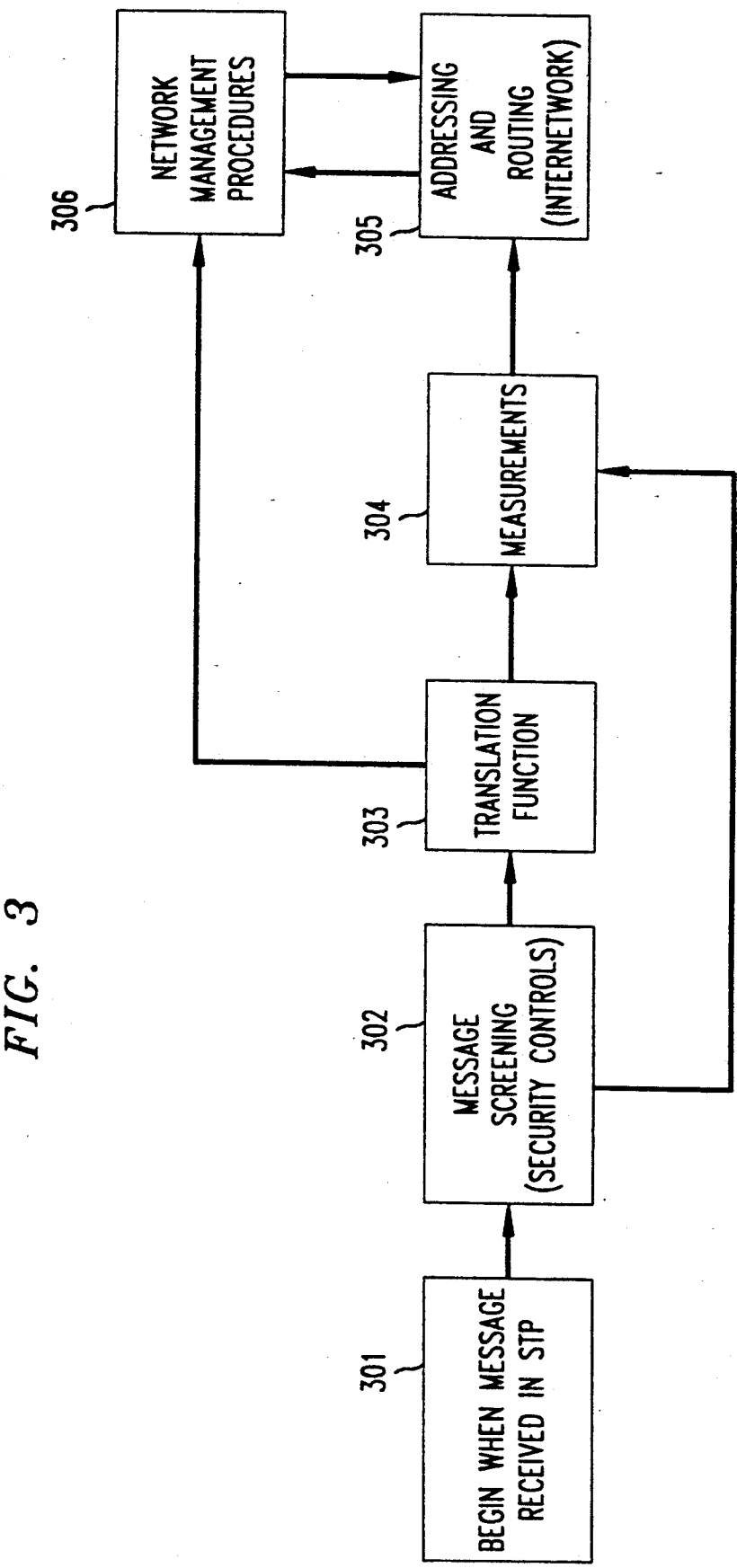
FIG. 3 illustrates the major functions performed in the virtual signaling network of the present invention.

Because of the new interconnections contemplated by this invention, new functionality must be incorporated within STPs 210-213, in order to provide shared access to network 201. These functions, which are illustrated by the functional flow diagram of FIG. 3, are implemented by properly programming the logic and control elements within each STP. The combination of these various functions is what allows network 201 to act as a virtual signaling network. The process begins at step 301 when a message, which may be a trunk signaling message or a database query/response message, is received in an STP. The message is screened in step 302 in order to assure that it meets established security controls and that it is in fact "eligible" for processing within shared signaling network 201. This screening function, which is explained in more detail in connection with FIG. 4, was performed in a more limited fashion prior to the present invention.

Figure 5:
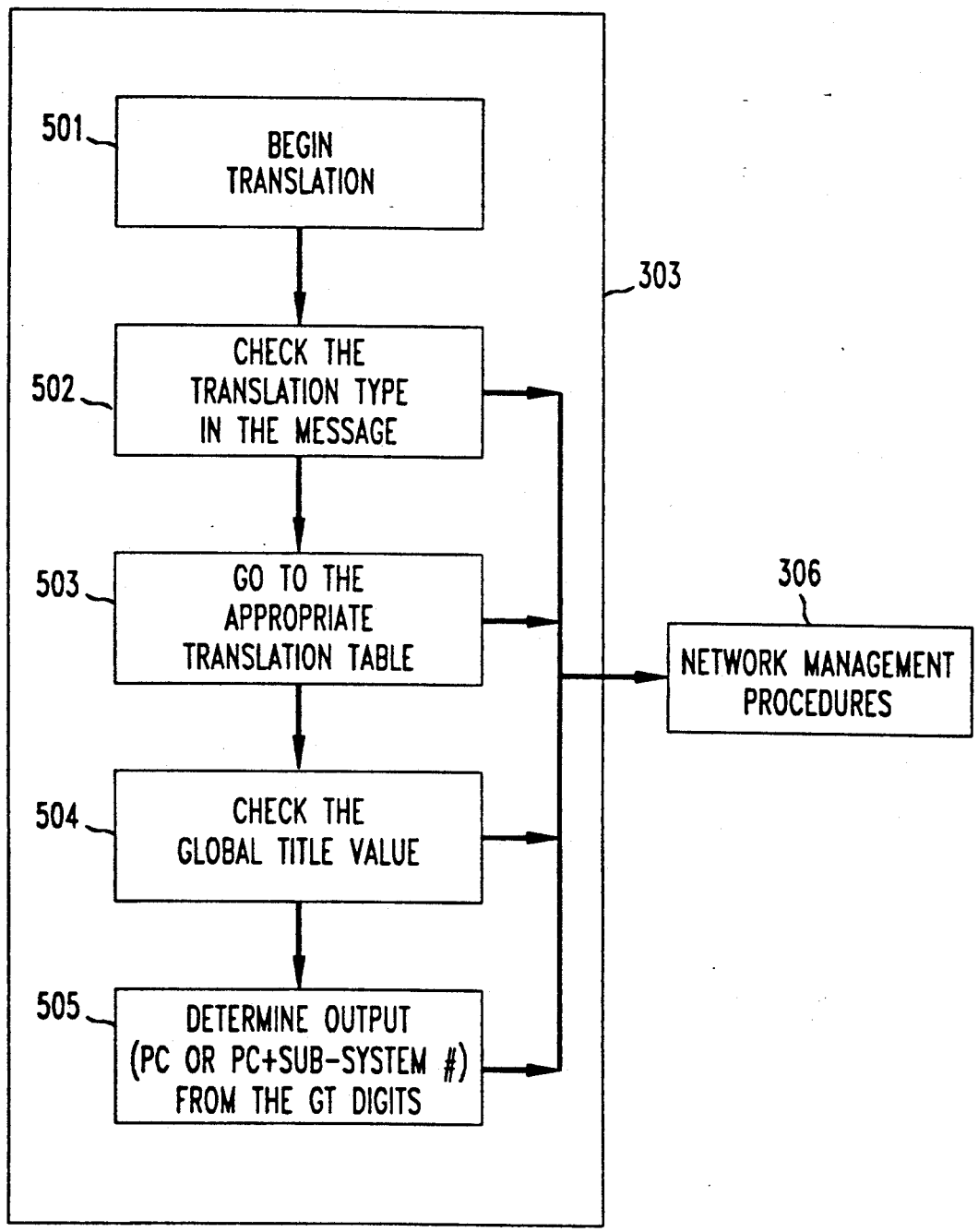
FIG. 5 illustrates the translation function of FIG. 3 in more detail.

During message screening in step 302, trunk signaling messages are screened differently from database messages. This is because only messages in the latter category need to be translated in step 303. The translation process, which is described in more detail in FIG. 5, is used to extract various "point codes" (PC) or point codes plus subsystem numbers, from each signaling message. Generally speaking, the translation performed in step 303 is similar to the translations performed in STPs that are currently available. However, the translation tables used in this process are updated to take into account the additional entries needed to allow routing to other networks, e.g., to networks 203 and 205 of FIG. 2.

Following translation, both trunk signaling and database messages are processed in a measurement step 304 so that the users of the virtual network can be charged and billed appropriately. Generally, the measurement process includes (a) determining the source of the message; (b) recording the date and time the message was received; and (c) recording certain details, such as the particular service to which the message relates. Billing, simply stated, contemplates grouping messages by source, and applying predetermined factors to the recorded information to generate a bill. The details of the measurements process are described below in connection with FIGS. 8 and 9.

After measurements are completed (or, if desired in some embodiments, concurrently with measurements), the messages output from translation step 303 are addressed and routed, in step 305, to the appropriate STP or switching point that is the final destination for the message. The addressing and routing process is described in more detail below, in connection with FIG. 6.

FIG. 3 also depicts a network management procedures step 306 that is performed only under certain circumstances, subsequent to translation in step 303 or addressing and routing in step 305. These procedures are generally intended to provide information about the status of the interconnecting networks. Since this type of process is also necessary in present day signaling networks, existing network management procedures that are described in the American National Standards Institute (ANSI), Message Transfer Part (MTP) and Signaling Connection Control Part (SCCP) specifications can be used in this step.

Figure 4:
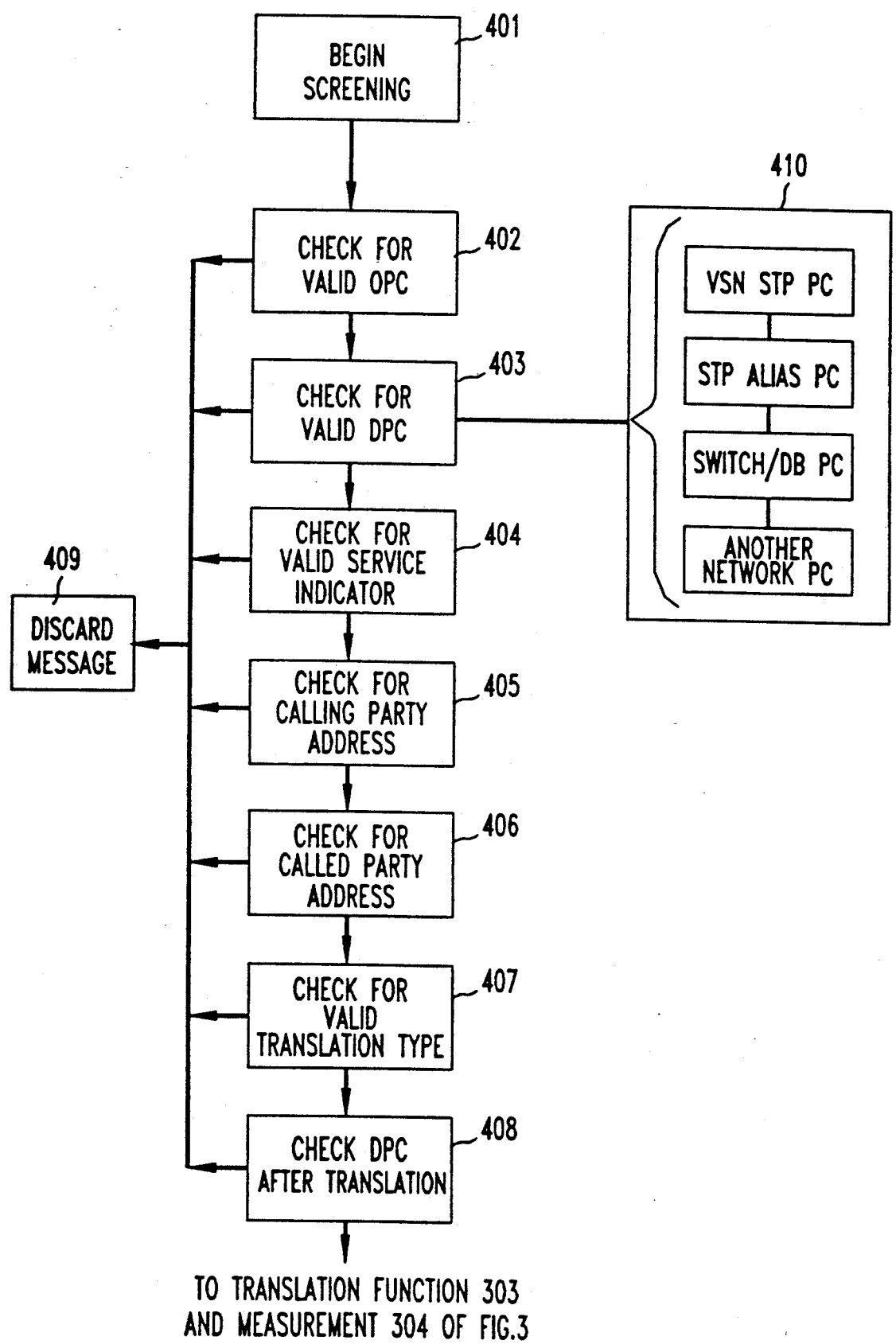
FIG. 4 illustrates the message screening function of FIG. 3 in more detail.

Referring now to FIG. 4, there is illustrated in greater detail the message screening process performed in STPs during step 302 of FIG. 2. This function is crucial to ensuring the security of the virtual signaling network. After initiation of the screening process in step 401, each message is checked in step 402 for a valid originating point code (OPC). This is done by checking if the originator of the message is a valid user of the virtual signaling network. If an invalid code is found in this step, or in any of the other checks performed in steps 403–408 described below, the message is discarded in step 409 and the process terminated. However, if the OPC is valid, the destination point code (DPC) is thereafter checked, also to determine its validity. This check is made against records stored in STP screening tables 410. As shown in FIG. 4, the STP screening tables 410 may contain records of (a) valid STP PCs for the STPs in network 206; (b) STP alias PCs; (c) valid PCs for switches 241,242,226,227,256–258,236 and 237 of FIG. 2; and (d) PCs for other networks not shown in FIG. 2.

If a valid PC is contained in the message, step 404 is initiated to check for a valid service indicator (SI). Only the service indicators for ISDN user part (ISUP) and/or SCCP messages are allowed.

Next, SCCP calling and called party addresses, contained in the message, are checked in steps 405 and 406, respectively. Thereafter, the translation type, (TT) which identifies the service type associated with the message, is validated in step 407. This is done by checking the translation type against a list of valid translation types for the particular user.

When step 407 is completed, the message is finally checked to determine that the DPC code, after translation, is still valid. This step, although shown in FIG. 4, may be performed as part of step 302 of FIG. 3. This must be done since the true destination of the message is known only after translation.

A more detailed view of the translation process performed in step 303 of FIG. 3 is presented in FIG. 5. The translation function is required on messages using SCCP addressing. This process, which begins at 501, is arranged to first check the translation type (TT) in the message being processed. The TT information is populated, i.e., inserted in the signaling message by the originating switch, and is used to control the translation process, as described further below.

If the TT is valid, the appropriate translation table stored in the STP is accessed in step 503, and the corresponding global title (GT) value is checked in step 504. This GT value is translated in step 505 to obtain the PC or PC plus subsystem number (SSN).

If, at any time during the translation process of FIG. 5, an incorrect or inconsistent value is obtained, the process is terminated and the network management procedures of step 306 are instituted.

Figure 7:
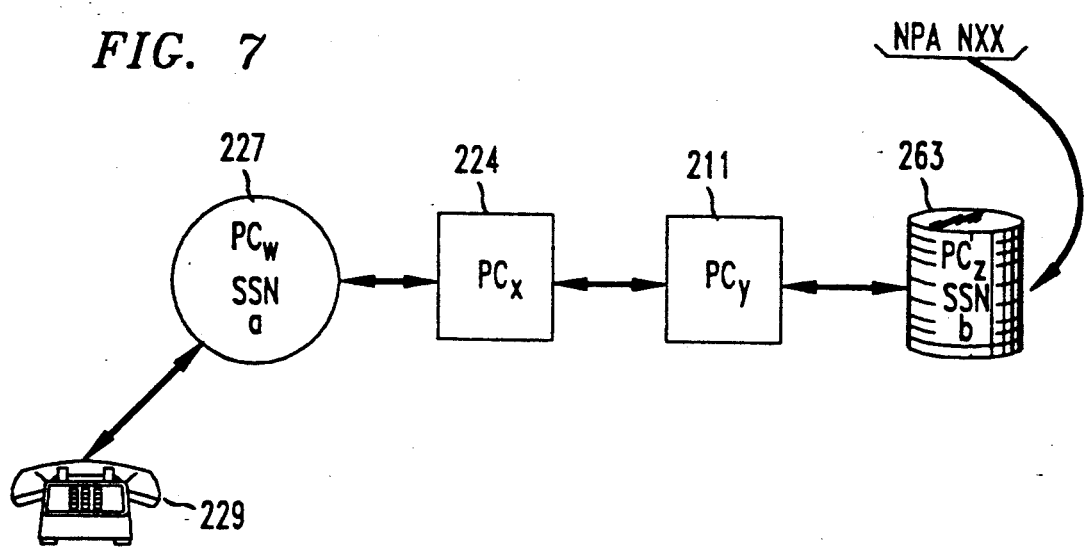
FIG. 7 illustrates the use of "point codes" to identify switches and STPs in the networks of FIG. 2.

The subsystem numbers and point codes mentioned above can be better appreciated by referring briefly to FIG. 7. In this figure, it is assumed that a call has originated in a terminal 229 connected to switch 227 in network 202 of FIG. 2, and that the caller is making a call that requires use of network 206, which requires access to database 263. This situation would exist, for example, when a long distance telephone call is activated using a calling card.

In this instance, the caller enters (a) a first series of digits indicating the identity of called party, and (b) a second series of digits indicating her or his calling card number. This information is assembled by an application program operating in switch 227 and transmitted to its associated STP (in this case STP 224) in a predefined format which includes (a) a translation type (TT) code; (b) a subsystem number which identifies the particular application (in this case credit card validation) to which the CCS message relates, and (c) information in a predefined format, such as NPA-NXX which identifies the called party destination. STP 224, in response to this information, determines the "point codes", i.e., network addresses, associated with each system element involved in the case. In this example, PCs for switch 227 as well as for STPs 224 and 211 and database 263 are determined. This is done so that the CCS message can be appropriately forwarded to the correct destination, in this case database 263, and so that the response can be communicated back to the originating switch 227, allowing the call to be routed as desired.

As stated above, the addressing and routing functions performed in step 305 of FIG. 3 are already well known, and are described in the ANSI T1.111 specification. However, for the sake of completeness and better understanding of our invention, these functions are explained in conjunction with FIG. 6. As shown therein, the process, which begins in step 601, first checks the message to determine if the DPC obtained in step 505 represents a valid address. This step determines if a link exists between the destination network and the virtual signaling network 201.

For each valid DPC found in step 602, the appropriate link set necessary for routing is determined in step 603. This is done by a simple look-up operation. Once the link set is determined, the message can be transferred in step 604. This involves transmitting the message over the appropriate internetwork link.

Figure 6:
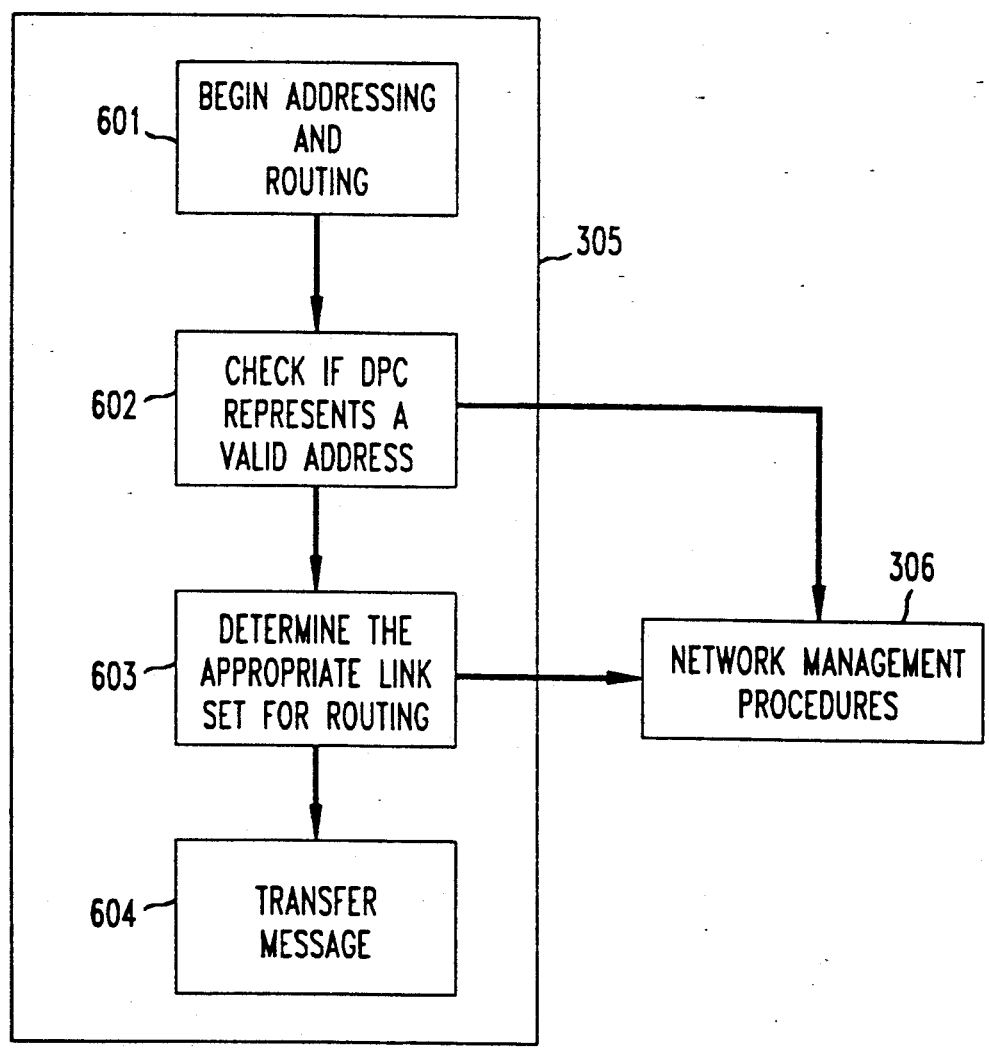
FIG. 6 illustrates the addressing and routing function of FIG. 3 in more detail.

If, at any time during the addressing and routing process of FIG. 6, an incorrect or inconsistent value is obtained, the process is terminated and the network management procedures of step 306 are instituted.

Figure 8:
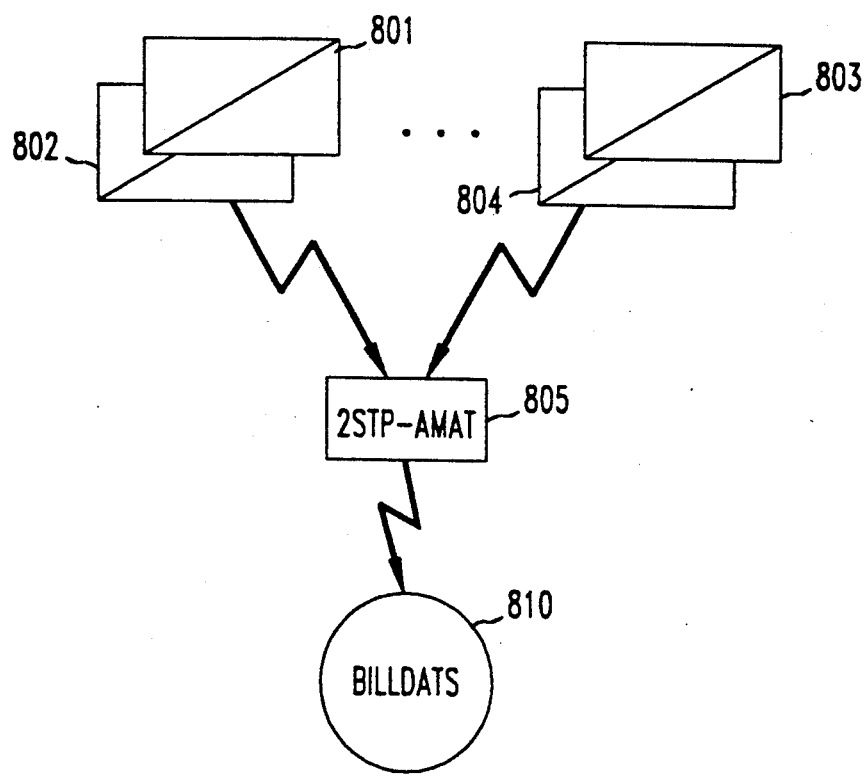
FIG. 8 illustrates the system arrangement for measuring usage of the shared signaling system of FIG. 2.

FIG. 8 illustrates, in high level block diagram form, the arrangement by which the measurements in step 304 of FIG. 3 are performed. In FIG. 8, STPs 801 and 802 represent one set of signal transfer points which are located within shared signaling network 201 in FIG. 2, while STPs 803 and 804 represent another set of STPs located in the same network. Each of these STPs, as well as the other STPs within network 201, are arranged to collect information describing certain of the common channel signaling messages passed through that STP. This function, which was not previously provided in STPs for the reason that in prior art arrangements, STPs were not "shared" as contemplated by the present invention, is accomplished by novel processing to be explained in more detail below in conjunction with FIG. 9. Briefly, each STP is advantageously arranged to store collected CCS measurements for a specified period of time, typically several days. Also, each STP is connected to one or more billing and measurement collector systems 805 which are arranged to poll each of the STPs 801–804 to collect CCS measurements made in each STP and to create an appropriate automatic message accounting (AMA) billing record containing the pertinent information obtained from those measurements. Collector system 805 includes data storage capacity for storing AMA records for several days and for periodically transmitting the records in batch form to a downstream billing collection and processing system such as AT&Ts existing Billing Data Acquisition and Test System (BILLDATS) bill production system 810, which is described in AT&T BILLDATS Collector, AT&T Network Systems-Marketing Brochure No. 3656 FS-CDF-11/90 and is available commercially from AT&T.

Figure 9:
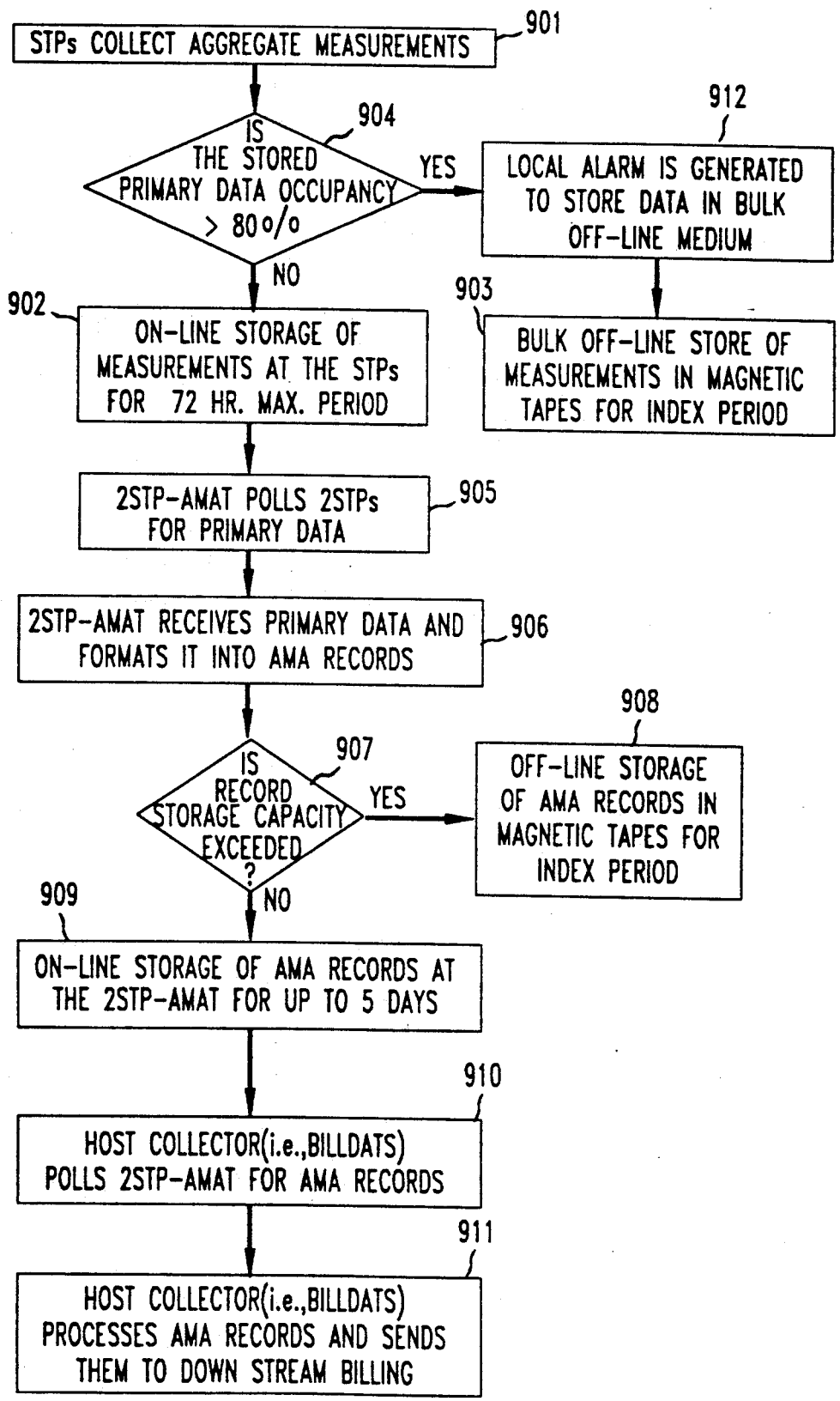
FIG. 9 is a flow diagram illustrating generally the steps in the measurement process performed by the system of FIG. 8.

FIG. 9 illustrates in flow diagram format the overall operation of the measurement process performed by the system shown in FIG. 8. The process begins in step 901, in which the STPs such as STPs 801-804 collect and aggregate measurements concerning CCS signaling messages received by each STP from the switch that routed the call to that STP. This is explained in more detail below in connection with FIG. 10. Most of the collected information is stored in on-line storage facilities in step 902 for a predetermined time interval typically several days. However, if the on-line storage capacity is determined to have temporarily exceeded a predefined threshold in test step 904, a local alarm is generated in step 912 and bulk off-line storage of measurement information in magnetic media for a longer time interval will instead occur in step 903.

In step 905, collector system 805 polls each of the STPs 801-804 in order to retrieve "primary data", i.e., data stored on-line in the STPs pending the forwarding operation. After forwarding, a copy of the data is nevertheless retained in the STPs for backup purposes, and may be retrieved if later needed. Data transfer between STPs 801-804 and collector system 805 may be accomplished through a high speed data link such as a 56 Kbps datalink using the X.25 protocol.

In step 906, collector system 805 receives and formats the collected measurement data into standard AMA record format. This is done so that a usage sensitive bill may be rendered to the individual users of the shared signaling system. Collector system 805 contains suitable storage facilities such as a conventional database system. When this database is at or near its desired capacity, a determination of the potential overflow condition is detected in step 907. As a consequence of a potential overflow, AMA records formatted in collector system 805 are stored offline in magnetic tapes or other semipermanent storage media, in step 908. On the other hand, under normal circumstances the AMA records are stored online for a desired period of time, typically several days, in step 909.

In a manner similar to that described above, bill production system 810 is arranged to poll collector system 805 periodically to enable transfer of stored AMA records to bill production system 810. Thereafter, in step 911, the records are processed appropriately, using known processing techniques, so that the users of shared signaling network 201 can be assessed or billed appropriately on a usage sensitive basis, for messages that are transported through the STPs within network 201.

Figure 10:
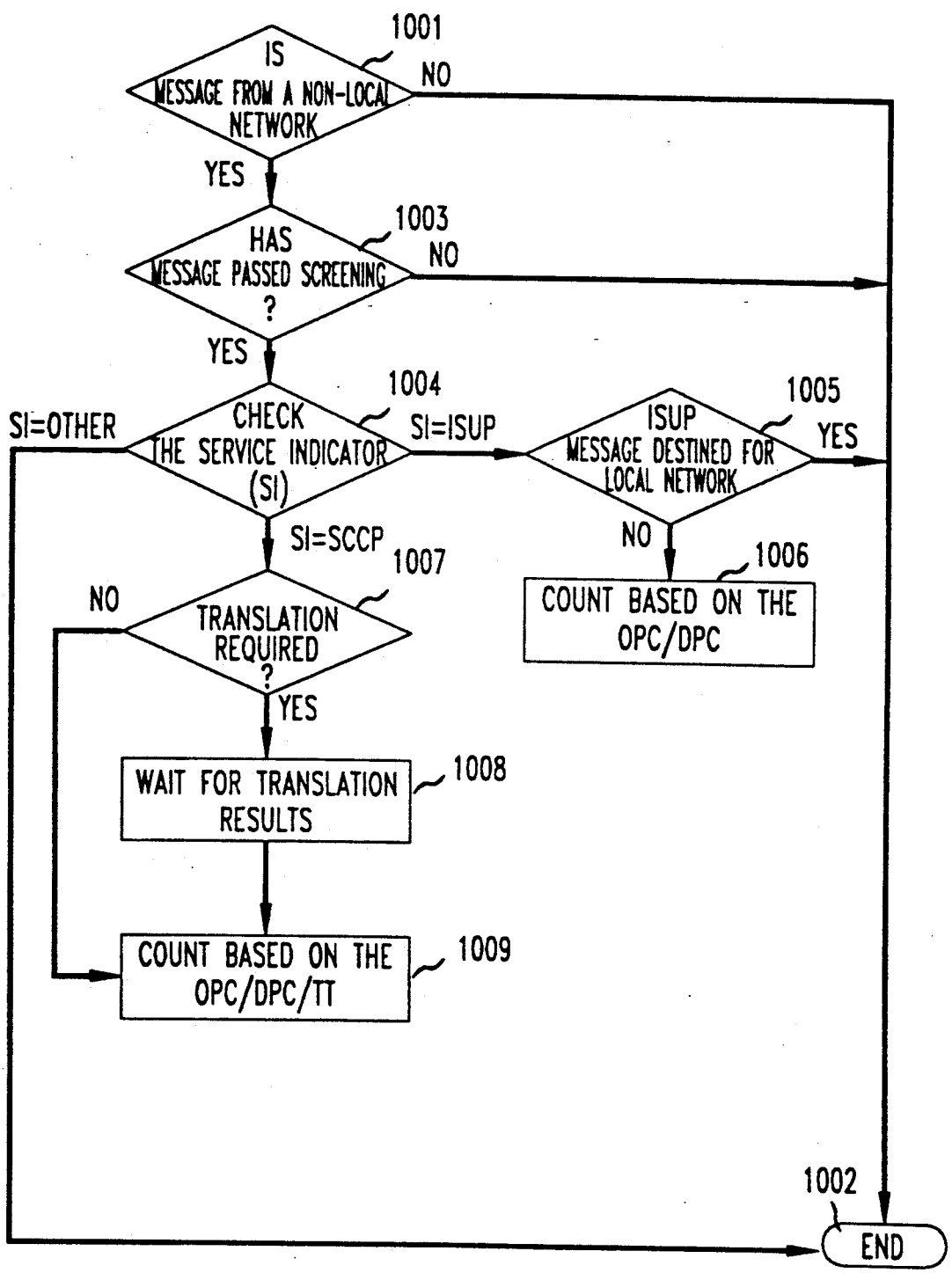
FIG. 10 is a more detailed flow diagram of the steps in the measurements collection step (step 901) of FIG. 9.

Referring now to FIG. 10, there is shown a flow diagram illustrating in more detail the process which takes place during measurement collection step 901 in FIG. 9. The process of FIG. 10 begins in step 1001, in which a determination is made if the message being processed originated in a non-local network or, alternatively, from a local network, i.e., network 206 which is the network associated with the shared signaling network 201. If the message is determined not to have originated in a non-local network, the process of FIG. 10 is terminated in step 1002, since measurements are not necessary for locally generated messages. On the other hand, if step 1001 produces the positive result, step 1003 is performed to determine if the message has passed the screening process in step 302, which is shown in detail in FIG. 4 and which was described above. Again, if a negative result is obtained, the process of FIG. 10 is terminated in step 1002. However, if a positive result is obtained, step 1004 is performed to ascertain the value of the service indicator (SI) contained within the message. If the SI indicates a format other than ISUP or SCCP, further processing is not necessary because the message is of a type (e.g., a network management message) which does not require measurement collection. If the SI indicates a message in ISUP format, a determination is made in step 1005 as to whether the message is destined for the local network (network 206) or for another network shown in FIG. 2. If a positive response is obtained indicating that the message is destined for network 206, the process is terminated in step 1002 since measurement information collection is not necessary in this instance. However, if the message is destined for a non-local network, a negative response in step 1005 results in a count of the message in step 1006, based upon the point codes for the originating and destination networks.

If it is determined in step 1004 that the message is in SCCP format, a test is performed in step 1007 to determine if a global title translation of the message is required. If translation is required, the process of FIG. 5 is performed and the translation results are received in step 1009. In this event, a count is made based upon the OPC, DPC and translation type in step 1010. On the other hand, if a global title translation is not required, a count based upon OPC, DPC and translation type is performed in step 1008.

Persons of ordinary skill in the art will realize that numerous modification and adaptations can be made with respect to our invention, and that the invention is to thus be limited only by the appended claims.

We claim:

1. In a shared signaling network, a method of processing signaling messages generated in one of a plurality of interconnected telecommunications networks, each of said signaling messages containing information used to control the routing of corresponding telecommunications traffic originating and/or terminating in said one of a plurality of interconnected telecommunications networks, said method comprising the steps of receiving said signaling messages in one of a plurality of interconnected signal transfer points (STPs);

screening received signaling messages in said STP to verify eligibility of said one of said interconnected telecommunications networks that originated said signaling messages to use said shared signaling network; and transmitting selected ones of said signaling messages to another one of said interconnected telecommunications networks, thereby enabling desired routing of said telecommunications traffic through said interconnected telecommunications networks.

2. The invention defined in claim 1 wherein said signaling messages include encoded information relating to the points of origin and destination of said telecommunications traffic, and wherein said method further includes the step of translating said encoded information.

3. A method of processing signaling messages originated in a first telecommunications network in a signaling network associated with a second telecommunications network, each of said signaling messages containing information used for routing associated telecommunications traffic, said processing method including the steps of:

screening said signaling messages to select messages authorized for processing;

translating information in said selected signaling messages to generate routing messages;

collecting translated information relating to said signaling messages; and addressing and routing said signaling messages to an appropriate destination, so as to enable transmission of said telecommunications traffic between said first and second telecommunications networks.

4. A method of transmitting signaling messages between interconnected signal transfer points (STPs), said signaling messages including information for controlling the flow of telecommunications messages between associated interconnected telecommunications networks, said method comprising the steps of:

determining the validity of each signaling message in one of said STPs, said determining step including determining the validity of various codes within said each signaling message; and passing validated messages between said one of said STPs and a destination in one of said interconnected telecommunications networks.

5. The method defined in claim 4 wherein said method further includes the step of collecting information relating to the number of valid signaling messages processed using said method.

6. A method for transmitting signaling messages including routing messages and/or data base queries between a plurality of interconnected signal transfer points (STPs) in a shared CCS7 signaling system, said method including the steps of determining the validity of information including originating point code (OPC) and destination point code (DPC) information in said signaling messages;

translating said DPC and OPC information in each validated message into a form suitable for controlling routing of a respective call between said STPs; and collecting information concerning each processed message.

7. A method for transmitting signaling messages and data base queries between a plurality of interconnected telecommunications networks, said networks each arranged to originate and/or terminate calls that begin in or are destined for others of said telecommunications networks, said signaling messages including encoded information describing the origin and destination of said calls and the type of encoding used to encode said signaling messages, said method comprising screening said signaling messages;

translating said encoded information in said signaling messages in accordance with said encoding type, and measuring the usage of said method by each of said telecommunications networks.

8. A method for processing signaling messages in a signal transfer point (STP), said signaling messages controlling the transport of calls in an associated telecommunications network, said method including:

screening said signaling messages to determine eligibility of the network originating each of said signaling messages to use said STP;

translating coded information in said signaling messages to enable transmission of said signaling messages to an ultimate destination in said telecommunications network; and storing information contained in said signaling messages for billing for usage of said STP.

9. The method defined in claim 8 wherein said method includes the step of performing a different sequence of processing steps for different types of signaling messages.

10. The method defined in claim 8 wherein said method further includes the step of discarding signaling messages determined to be ineligible to access said STP.

* * * * *